Figure 1:
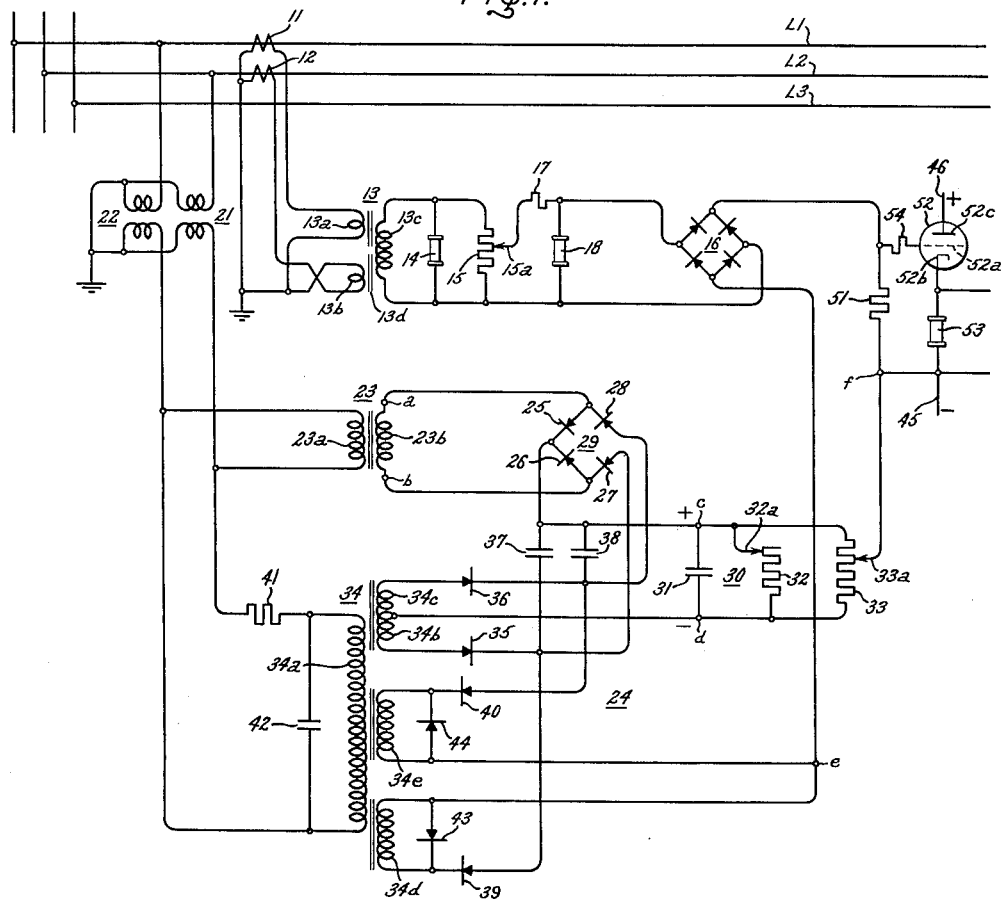

May 9, 1961    M. E. HODGES    2,983,851
ELECTRIC CURRENT RECTIFYING SYSTEM
Filed Nov. 29, 1956

Inventor:
Merwyn E. Hodges,
by J. Wesley Haubner
His Attorney.

United States Patent Office 2,983,851
Patented May 9, 1961

2,983,851
ELECTRIC CURRENT RECTIFYING SYSTEM

Merwyn E. Hodges, Philadelphia, Pa., assignor to General Electric Company, a corporation of New York Filed Nov. 29, 1956, Ser. No. 625,094

15 Claims. (Cl. 317—36)

This invention relates to electric current rectifying systems, and more particularly to a rectifying system having an output of very smooth direct voltage which responds extremely rapidly to an input alternating voltage of decreasing amplitude.

There are many applications for an electric device which compares two separate alternating input signals and operates to produce a resultant output signal when the magnitude of one of the input signals exceeds that of the other. For example, in a distance relay of the impedance type, which is a well known device used for protecting an electric power transmission line, operation is desired whenever the algebraic product of transmission line current multiplied by a predetermined constant impedance exceeds the transmission line voltage.

There are two fundamental principles of operation for devices which compare the magnitudes of alternating electric quantities: the input signals may be converted into opposing forces which actuate a common movable element; or the input signals may be rectified to produce opposing direct voltages arranged to supply an electroresponsive device which responds only to a net direct voltage of predetermined polarity. The present invention is concerned with the second principle. In such a device the alternating input signals may have a variable phase relationship with respect to each other, and steady state accuracy is dependent upon the degree to which the rectifying means produce smooth direct voltages. Relatively large capacitors conventionally are connected to the D.-C. terminals of the rectifying means to improve smoothness, but because of the delay in charging or discharging such capacitors, accurate comparison can not be obtained following a change in input signal magnitude until sufficient time has elapsed to allow a new steady state condition to be reached. Fast response is thus inherently in compromise with steady state accuracy.

The transient conditions which require fast response will very frequently involve a decrease in one of the two input signals. This signal is, of course, the one which normally prevents operation of the device, and it will be referred to as the restraining input quantity. Accordingly, it is an object of this invention to provide an electric current rectifying system for converting an alternating restraining quantity into a smooth direct voltage which responds extremely rapidly to any decrease in the magnitude of the restraining quantity.

It is a further object of this invention to provide a rectifying system for producing an output of relatively smooth direct voltage which will accurately reflect within one-half cycle any decrease in the amplitude of an alternating voltage input.

Still another object of the invention is the provision of an impedance type distance relay, for protecting an electric power transmission line, having a rectifying system which enables an operating characteristic of the relay to vary in controlled relation to the phase angle between transmission line current and voltage.

In carrying out my invention in one form, I provide energy storing means coupled to a source of variable alternating voltage by means of suitable electric valves for obtaining a relatively smooth direct voltage having, under steady state conditions, a predetermined relationship to the peak magnitude of the alternating voltage. In circuit with the energy storing means I connect means impulsively operable during each half cycle of alternating voltage to reduce the direct voltage to not less than the instantaneous magnitude of alternating voltage at the corresponding moment of time. Thus, the direct voltage produced by my rectifying systems will reflect within one-half cycle any decrease in alternating voltage amplitude.

The above described rectifying system may be used in a voltage comparison device to provide a smooth blocking or restraining voltage. If the output of this rectifying system were connected in series with a source of operating voltage and an electroresponsive element, the direct voltage produced thereby would prevent operation of the electroresponsive element as long as its magnitude is greater than the magnitude of operating voltage.

Figure 2:
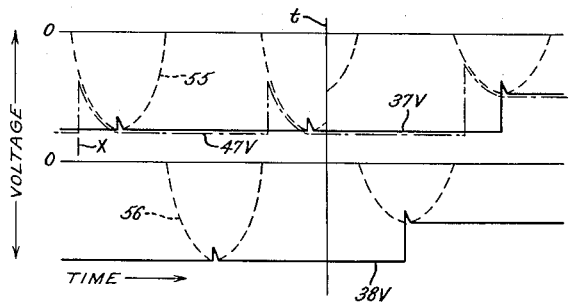

My invention will be better understood and further objects and advantages will be apparent from the following description taken in conjunction with the accompanying drawing in which:

Fig. 1 is a schematic diagram of a voltage comparison device which illustrates a preferred embodiment of my invention; and Fig. 2 is a graphical representation of a voltage-time characteristic obtained in accordance with my invention.

In Fig. 1, I have shown an impedance type relay for an electric power transmission line which is represented by phase conductors L1, L2 and L3. The relay is resigned to operate in response to predetermined faults or short circuit conditions involving phase conductors L1 and L2. Operation of the relay will produce a signal indication which causes suitable protective equipment, not shown, to function.

To obtain an impedance operating characteristic, the relay is supplied with an alternating operating voltage related to transmission line current by a preselected constant impedance which determines the operating range of the relay. The relay is also supplied with an alternating restraining voltage representative of transmission line voltage. The ratio of transmission line voltage to current defines the apparent impedance of the transmission line as viewed from the relay location, and during a short circuit or fault condition this ratio represents the actual impedance of the transmission line between the relay and the fault location. If the impedance to the fault is less than the aforesaid preselected constant impedance, the magnitude of the operating voltage must be greater than that of the restraining voltage, and relay operation is obtained. Under fault conditions, the transmission line voltage will experience a marked decrease in magnitude due to the impedance of the electric power apparatus between the source of power generation and the relay location. Therefore, fast relay operation can be achieved by providing for an immediate response to the reduction of restraining voltage.

To derive an operating voltage which is proportional to the current in transmission line conductors L1 and L2, I provide two star-connected current transformers 11 and 12 as shown in Fig. 1. These current transformers supply suitable transforming means 13 which, for the purposes of the illustrated embodiment of my invention, preferably comprises a pair of primary windings 13a and 13b, a secondary winding 13c, and a common iron core 13d having an air gap. The primary windings 13a and 13b are supplied by current transformers 11 and 12 respectively. These two primary windings have an equal number of turns, and total ampere turns in the transforming means 13 is proportional to the vectorial difference between the transmission line currents flowing in conductors L1 and L2. Thus, the primary windings 13a and 13b effectively simulate a single primary winding supplied by current from delta-connected current transformers.

Transforming means 13 derives across its secondary winding 13c a voltage representative of the vector difference of currents in transmission line conductors L1 and L2 both in magnitude and phase over the operating range of current, while minimum burden is imposed on current transformers 11 and 12. Due to the high percentage of total primary current used for magnetizing iron core 13d and its air gap, no appreciable initial transient D.-C. component of fault current will be reproduced in the secondary voltage. The transforming means 13 also serves as a desirable means for electrically insulating succeeding relay circuits from the current transformer connections.

It is possible that during a fault condition of maximum current an extremely large voltage may be induced in the secondary winding 13c. To prevent injury to the insulation of the winding which might otherwise be damaged by such large voltage, a voltage limiter 14 is connected across secondary winding 13c. The voltage limiter has a non-linear current-voltage characteristic, that is, the ohmic value of the limiter decreases with increasing voltage applied across it so that current will increase at a greater rate than voltage. Many such non-linear current-voltage characteristic devices are known in the art, and for the purposes of the illustrated embodiment of my invention I prefer at present to use a special ceramic resistance material comprising silicon carbide crystals held together by a suitable binder, such as described in United States Patent 1,822,742, issued to Karl B. McEachron on September 8, 1931. The limiter 14 provides means for increasing secondary load as the secondary voltage increases thereby limiting the maximum possible peak value of secondary voltage to a safe level without interfering with measurement accuracy at the normally smaller values of voltage.

Transforming means 13 is loaded by a potentiometer 15 connected across secondary winding 13c. The voltage appearing across the tapped portion of potentiometer 15, as determined by the position of a slider 15a, has a fixed relationship to the total ampere turns producing this voltage. This fixed relationship is in units of ohms and is the above-mentioned preselected constant impedance which determines the operating range of the relay. Thus, the voltage across the tapped portion of potentiometer 15 comprises the alternating operating voltage which must now be rectified to provide a direct operating voltage suitable for magnitude comparison. The rectification is accomplished by suitable rectifying means, such as the full-wave bridge type rectifier 16 illustrated in Fig. 1. The direct operating voltage is not smoothed but appears in the form of successive unipolarity half cycles which bear a fixed phase relation to transmission line current. The direct operating voltage is proportional to the instantaneous magnitude of the alternating operating voltage and will instantly reflect any change in line current magnitude.

A voltage limiting circuit comprising a resistor 17 and a voltage limiter 18 is provided between potentiometer 15 and rectifier 16 to protect the rectifier from damaging high voltage levels. Limiter 18 may be similar to limiter 14 described above. As the alternating voltage rises to excessively high values, the resistance of limiter 18 becomes less, and a non-linearly increasing voltage drop is produced across resistor 17 thereby limiting the voltage level at rectifier 16.

To obtain a restraining voltage from the phase-to-phase voltage of transmission line conductors L1 and L2, a pair of potential transformers 21 and 22 are provided as shown in Fig. 1. These potential transformers supply suitable transforming means 23 comprising, for example, an iron core transformer having a primary winding 23a connected to the potential transformers and a secondary winding 23b. Transformer 23 in addition to deriving across its secondary winding a voltage which represents the transmission line voltage between conductors L1 and L2 both in magnitude and phase, also insulates succeeding relay circuits from the potential transformer connections. Opposite terminals a and b of transformer secondary winding 23b provide input or supply terminals for a rectifying system 24 which converts the alternating input voltage supplied by transformer 23 into a relatively smooth direct restraining voltage suitable for magnitude comparison.

The rectifying system 24 includes rectifying means such as provided by the four half-wave rectifiers or electric valves 25, 26, 27, and 28 connected as is shown in Fig. 1 to form a full-wave bridge type rectifier 29. The common connection between half-wave rectifiers 25 and 26 forms the positive terminal of the bridge type rectifier 29, and this terminal is connected to a positive terminal c of an impedance circuit 30 comprising a capacitor 31, a tapped resistor 32 and a potentiometer 33 all connected in parallel circuit relationship. Impedance circuit 30 performs an electric energy storing function and may be regarded as an energy storing circuit or element. A negative terminal d of circuit 30 is connected to the negative terminal of half-wave rectifier 27 by means of a unilaterally conductive circuit comprising a peaking transformer winding 34b and a half-wave rectifier or electric valve 35. The negative terminal d of the energy storing circuit 30 is also connected to the negative terminal of half-wave rectifier 28 by means of another unilaterally conductive circuit comprising a peaking transformer winding 34c and a half-wave rectifier 36. The peaking transformer performs a pulsing function, as will be described in detail hereinafter.

During one half cycle of alternating input voltage, current is conducted from input terminal a, through rectifier 25, through the circuit 30, through winding 34b, and through rectifiers 35 and 27 to input terminal b. During the next half cycle of alternating input voltage, current is conducted from input terminal b, through rectifier 26, through circuit 30, through winding 34c, and through rectifiers 36 and 28 to input terminal a. Thus, direct current is conducted alternately by the two half-wave components of full-wave rectifier 29, and a direct voltage is produced across the circuit 30. This direct voltage will be designated the "reference voltage."

A relatively long time constant is established in circuit 30 by appropriately setting a slider 32a of tapped resistor 32 and by selecting appropriate values of capacitance and resistance for capacitor 31 and potentiometer 33. For example, a capacitance of 1.5 microfarads might be selected for capacitor 31, potentiometer 33 could be rated 250,000 ohms, and at least 75,000 ohms might be connected in the circuit by slider 32a of tapped resistor 32. The time constant must be sufficiently great to ensure that the energy stored by capacitor 31 will be retained for a period longer than that of a half cycle of the alternating input voltage. Due to the long time constant, the magnitude of reference voltage is maintained substantially constant during the periods between the peaks of successive half cycles of input voltage. Accordingly, the reference voltage is very smooth, and it will not immediately reflect changes in input voltage magnitude.

An energy storing element or circuit comprising capacitor 37 is connected from the positive terminal of the bridge type rectifier 29 to the negative terminal of half-wave rectifier 27. Another energy storing circuit comprising another capacitor 38 is connected from the positive terminal of rectifier 29 to the negative terminal of half-wave rectifier 28. Each of the capacitors 37 and 38 has less energy storing capacity than capacitor 31 of circuit 30. For example, each capacitor might have a capacitance rating of .05 microfarad. Due to the rectifying action of the half-wave components of rectifier 29, the capacitors 37 and 38 are charged during alternate half cycles of input voltage, and a direct "signal voltage" is developed across each. Under steady state conditions, the maximum magnitude of the signal voltages of capacitors 37 and 38 will be equal to some predetermined portion of the peak magnitude of the input voltage. It may be assumed that this maximum magnitude is substantially equal to the input voltage amplitude.

As is evident in Fig. 1, the only current conducting path by which the energy stored in capacitor 37 can be removed is through the serially-connected energy storing circuit 30, peaking transformer winding 34b and rectifier 35. Similarly, the only current conducting path provided for capacitor 38 comprises serially connected circuit 30, winding 34c and rectifier 36. In the absence of induced voltage in either peaking transformer winding 34b or 34c, the magnitudes of the signal voltages would remain substantially equal to the amplitude or peak magnitude of input voltage, since discharge of capacitors 37 and 38 is blocked by the opposing reference voltage maintained across circuit 30.

The peaking transformer windings 34b and 34c are effective, in a manner than will be explained hereinafter, periodically to depress the magnitude of signal voltages. Neglecting the effect of the alternating input voltage supplied to the bridge type rectifier 29, a signal voltage can be maintained at a magnitude less than the reference voltage, since the resulting voltage difference in the associated current conducting path will appear across rectifier 35 or 36 with a polarity to bias the rectifier in its reverse or non-conducting direction. In other words, rectifiers 35 and 36 act as blocking or isolating means which prevent the transfer of electrical energy from the electric energy storing circuit 30 to capacitors 37 and 38 respectively.

The negative terminal of capacitor 37 is connected through a half-wave rectifier or electric valve 39 and another peaking transformer winding 34d to form an output circuit which is connected to a negative terminal e of the rectifying system 24. Similarly, the negative terminal of capacitor 38 is connected through a half-wave rectifier 40 and through still another peaking transformer winding 34e to form a second output circuit which is connected in parallel with the first output circuit. The rectifiers 39 and 40 are arranged to prevent an interchange of electric energy between capacitors 37 and 38, that is, rectifiers 39 and 40 isolate the two interconnected output circuits and prohibit circulating currents therein.

The positive terminal c of both capacitors 37 and 38 is connected through a portion of potentiometer 33 and its slider 33a to a positive terminal f of the rectifying system 24. Thus, under steady state conditions and in the absence of an induced voltage across either peaking transformer winding 34d or 34e, an output or restraining voltage comprising the signal voltage less the adjustable voltage drop across the tapped portion of potentiometer 33, as determined by the setting of slider 33a, is derived between output terminals f and e of the rectifying system. If the magnitudes of the two signal voltages are not the same, the lower one will determine the value of output voltage which is effective in opposing operating voltage to restrain or block operation of the illustrated impedance relay. Rectifiers 39 and 40 are arranged so that direct current can be conducted only in a direction into positive terminal f, through the parallel-connected output circuits, and out of negative terminal e. Thus, the rectifying system 24 is unable to supply energy to the external circuits connected to its output terminals.

As is shown in Fig. 1 by way of example, a peaking transformer 34 is provided to perform a periodic pulsing function in my rectifying system. The magnetic core structure of this transformer may include three saturable portions on which the secondary windings 34b–34e are disposed and one non-saturating portion on which a primary winding 34a is located. The primary winding 34a is coupled to potential transformers 21 and 22 through an isolating resistor 41. A capacitor 42 is connected across the primary winding 34a. The parallel inductance-capacitance circuit comprising winding 34a and capacitor 42 is tuned to the alternating voltage frequency and together with resistor 41 forms a memory circuit. The memory circuit acts to sustain some voltage at the peaking transformer 34 for a few cycles following a sudden decrease in transmission line voltage. Thus, it is assured that peaking transformer output will be maintained during a fault condition of zero transmission line volts. The manner in which the peaking transformer secondary windings 34b–34e are connected in the rectifying system 24 has been described hereinbefore.

The peaking transformer 34 is impulsively operable, as is well known to those skilled in the art, to produce a voltage pulse in each of its secondary windings just as the magnetizing current in its primary winding 34a passes through zero every half cycle. The magnetizing current will lag the primary voltage supplied to winding 34a by approximately 90 electrical degrees, and therefore induced voltage pulses coincide in time with the peaks of the primary voltage. The polarity of primary voltage determines the polarity of induced voltage pulse. By virtue of the parallel resonance of primary winding 34a and capacitor 42, the primary voltage in the illustrated embodiment of my invention is in phase with the input voltage which is supplied to the rectifying system 24 from transformer 23. Thus the peaking transformer operates to produce a pulse of voltage at the moment when the instantaneous value of input voltage is greatest during each half cycle. If desired, it is possible to vary to a known degree the phase relationship between primary and input voltages by connecting capacitance and resistance, not shown, in series with transformer winding 23a, whereby input voltage peaks would occur at some preselected moment before or after peaking transformer operation.

As is shown in Fig. 1, half-wave rectifiers or electric valves 43 and 44 are connected across secondary windings 34d and 34e respectively. Rectifiers 43 and 44 provide shunt paths of negligible resistance for current flowing in one direction only thereby preventing the appearance across the terminals of windings 34d and 34e of those voltage pulses which have a polarity tending to cause current flow in this direction. In lieu of the peaking transformer 34 which I have described above in connection with the illustrated embodiment of my invention, other suitable pulsing means might be used for periodically producing the desired voltage impulses.

The direct restraining voltage derived by rectifying system 24 appears across the output terminals e and f, with terminal e being negative with respect to terminal f. Output terminal f is connected to a negative bus 45 of a unidirectional control voltage source, such as a battery, which has not been shown. Accordingly, terminal e is at a potential more negative than negative bus.

Output terminal e is connected to the negative terminal of the bridge type rectifier 16 which produces the direct operating voltage as described hereinbefore. A resistor 51 having a relatively high ohmic rating, such as 1.5 megohms for example, is connected between the positive terminal of rectifier 16 and output terminal f. Thus, a closed direct current loop is formed including resistor 51, rectifier 16, and the output circuits of rectifying system 24. Current can flow through resistor 51 only in a direction from the positive terminal of rectifier 16 to negative bus. Since the operating and restraining voltages are connected in opposition, direct current can flow through resistor 51, thereby developing a unidirectional voltage across this resistor, only while the magnitude of operating voltage is greater than the magnitude of restraining voltage.

Unidirectional voltage developed across resistor 51 supplies control grid 52a of a cathode follower vacuum tube 52. As can be seen in Fig. 1, cathode 52b of tube 52 is connected to negative bus through a non-linear cathode resistor 53 which may be similar to the voltage limiter 14 described above. The cathode heater and heater circuit, being well known to those skilled in the art, have been omitted. The anode or plate 52c of tube 52 is supplied with positive potential from a positive bus 46 of the unidirectional control voltage source. The quiescent or non-operated point of tube 52 corresponds to a control grid voltage of zero volts with respect to negative bus. A grid resistor 54 is provided to limit grid current whenever grid 52a is driven positive with respect to cathode 52b.

As long as no current flows through resistor 51, control grid 52a is at negative bus potential and tube 52 consequently is conducting only a very small quiescent current. When the potential of grid 52a goes positive with respect to negative bus, conduction in tube 52 immediately increases. The increased tube current produces a resultant unidirectional voltage signal across cathode resistor 53. This voltage signal is available to trigger suitable electro-responsive means, such as a thyratron, which results in operation of associated protective equipment not shown. By using a non-linear cathode resistor 53, the resultant signal can be limited to a desirable maximum voltage level regardless of the magnitude of voltage supplied to grid 52a.

Having described in detail the components and circuitry of the illustrated impedance relay employing my invention, I will now explain the mode of operation of the rectifying system 24 whereby I obtain a smooth restraining voltage which responds immediately to decreasing transmission line voltage. In this connection reference will be made to Fig. 2 which graphically demonstrates voltage-time relationships in the rectifying system. Solid lines 37V and 38V in Fig. 2 represent the idealized signal voltages appearing across capacitors 37 and 38 respectively, and broken lines 55 and 56 are coincident in time with successive half cycles of the input voltage of transformer secondary winding 23b. The zero voltage level in Fig. 2 is taken at point c of the rectifying system 24.

Consider first only one-half of the rectifying system 24. The half cycles of alternating input voltage which cause the supply terminal a to be positive with respect to terminal b will be designated the positive half cycles of input voltage. Successive positive half cycles of input voltage coincide in time with the waveform represented by reference character 55 in Fig. 2. During each positive half cycle, unidirectional current can flow from terminal a through half-wave rectifier 25 and return to terminal b via half-wave rectifier 27, thus supplying electrical energy from transformer 23 to the parallel-coupled capacitor 37 and impedance circuit 30. Energy is stored by capacitor 37 and circuit 30, and due to the relatively long time constant of circuit 30, the stored energy is retained during the gaps between successive positive half cycles of input voltage. Thus relatively constant signal and reference voltages are maintained. The signal voltage across capacitor 37 has been indicated in Fig. 2 by the reference character 37V which represents the voltage of the capacitor terminal connected to rectifier 35 with respect to terminal c.

The pulsing means, illustrated as peaking transformer 34, operates during each positive half cycle of input voltage to produce a unipolarity voltage impulse in winding 34b. This voltage impulse will have a polarity opposing the reference voltage, that is, the terminal of winding 34b which is connected to the negative terminal d of circuit 30 will be negative with respect to the opposite terminal of winding 34b. The voltage impulse will impel current circulation in the current conducting path of capacitor 37, that is, in the forward direction through rectifier 35, from the negative to the positive terminal through capacitor 37, and from positive terminal c to negative terminal d through the circuit 30. As a result, the energy stored in capacitor 37 and circuit 30 is redistributed, with some of the energy stored by capacitor 37 being transferred to circuit 30. Since the energy storing capacity of circuit 30 is relatively large, the energy change produced by the circulating current is only a small portion of the total energy stored in this circuit and the reference voltage will be increased by a negligible amount. The amount by which the signal voltage of capacitor 37 is decreased is determined by the condition of the input voltage as will now be explained in detail.

The circulating current caused by the voltage impulses in peaking transformer winding 34b may be diverted from capacitor 37 by a shunt path comprising, as is shown in Fig. 1, half-wave rectifier 27, secondary winding 23b of transformer 23, and half-wave rectifier 25. Shunt current in winding 23b produces a voltage drop having a polarity opposite to that of the positive half cycle of input voltage, but because the effective impedance of winding 23b is relatively small, the net voltage across this winding will never be reduced by more than a slight amount. If the voltage impulse in winding 34b should occur at a moment when the instantaneous magnitude of input voltage is equal to the signl voltage of capacitor 37, the half-wave rectifiers 27 and 25 will be able freely to conduct current in their forward directions, and the shunt path through these rectifiers and winding 23b will present relatively little impedance to the circulating current. As a result, most of the circulating current follows the shunt path and capacitor 37 is discharged only slightly. On the other hand, if the voltage impulse should occur at a predetermined moment when the instantaneous magnitude of input voltage is less than the signal voltage, the difference voltage will appear across rectifiers 27 and 25 thus biasing these rectifiers in their reverse directions. In other words, the positive terminal c of capacitor 37 will now be more positive than input terminal a, and the other terminal of capacitor 37 will be more negative than input terminal b. Under this condition, no appreciable current can be conducted in the forward direction by rectifiers 27 and 25, and all of the circulating current must pass through capacitor 37 thereby rapidly discharging this capacitor until its voltage is reduced to a level equal to the instantaneous magnitude of input voltage at the corresponding moment of time. Only then will the shunt circuit divert circulating current from capacitor 37.

The energy removed while capacitor 37 is discharging during a voltage impulse can be replaced immediately following such impulse by energy available from the source of input voltage but not by the energy storing circuit 30, due to the blocking action of rectifier 35. Thus, if the amplitude of input voltage has not been changed since the preceding unipolarity voltage impulse, capacitor 37 will be recharged following each voltage impulse and the signal voltage magnitude will again equal the magnitude of reference voltage. In the illustrated embodiment of my invention, the voltage impulse is coincident with an input voltage peak, and thus the recharging process takes place instantly after each pulse. The resulting momentary depressions in signal voltage magnitude during the positive half cycles of input voltage are clearly shown by line 37V in Fig. 2.

If the circuit were arranged to produce a voltage impulse prior to the peak of input voltage, for example at a moment x (Fig. 2) 60 electrical degrees in advance of peak voltage, the signal voltage, after a momentary reduction below the corresponding instantaneous magnitude of input voltage, would assume the waveform of the input voltage until peak value is attained, at which maximum magnitude the signal voltage would remain substantially constant until the corresponding voltage impulse occurs during the next cycle. The broken line 47V in Fig. 2 illustrates the resulting signal voltage for this arrangement. Similarly, if the circuit were modified to produce a voltage impulse at a preselected moment following a peak of input voltage, the signal voltage would remain substantially constant at the corresponding instantaneous magnitude of input voltage until the increasing portion of the succeeding positive half cycle when the signal voltage would assume the waveform of the input voltage until peak value is attained. The relationship of signal voltage to the peak magnitude of input voltage under steady state conditions is determined by the selection of the moment for pulsing means operation.

If the input voltage should suddenly decrease due to the occurrence of a fault on the protected transmission line at a moment such as indicated by vertical line $t$ in Fig. 2, capacitor 37 will not be recharged to the reference voltage level following the next voltage impulse of appropriate polarity from peaking transformer winding 34b. The signal voltage can not be made more negative than the peak value of input voltage, and thus, as is shown in Fig. 2, the signal voltage will now reflect the new reduced magnitude of alternating input voltage. Blocking rectifier 35 prevents circuit 30 from replacing the energy removed from capacitor 37 during the voltage pulse. The signal voltage will now be maintained at its new lower magnitude while the reference voltage gradually decays, as controlled by the long time constant of circuit 30, to a corresponding lower level. It will be observed that the pulsing means, by operating periodically to impel the transfer of electric energy from capacitor 37 to circuit 30, makes it possible for the signal voltage of capacitor 37 to reflect within one cycle any reduction in the magnitude of input voltage.

One output circuit of rectifying system 24 comprises capacitor 37 connected in series with the rectifier 39 and peaking transformer winding 34d. Winding 34d serves as neutralizing means which is effective momentarily to offset in the output circuit the effect of a voltage impulse induced in winding 34b. As explained above, the signal voltage magnitude is reduced, as a result of the voltage impulse in winding 34b, to a magnitude somewhat less than the corresponding instantaneous magnitude of input voltage during each positive half cycle of the input voltage. This momentary reduction could possibly cause false operation of the impedance relay if it were reflected in the restraining voltage output of rectifying system 24. However, during each positive half cycle of input voltage, there is simultaneously induced in winding 34d a voltage pulse having a polarity aiding the signal voltage, that is, the terminal of winding 34d which is connected to the negative terminal of capacitor 37 will be positive with respect to the opposite terminal of winding 34d. The simultaneously produced voltage pulse of neutralizing means 34d adds to the signal voltage and tends to increase the restraining voltage output thus offsetting or neutralizing the momentary decrease in signal voltage below the corresponding instantaneous magnitude of input voltage. Other equally effective means could be provided in place of a peaking transformer winding to accomplish this neutralizing function.

During each negative half cycle of input voltage, that is, the intermediate half cycle which causes input terminal $a$ to be negative with respect to terminal $b$, the peaking transformer operates to produce in winding 34b a voltage impulse having a polarity aiding the reference voltage. This voltage pulse is absorbed across rectifier 35 which blocks current flow, and thus the signal and reference voltages are undisturbed. At the same instant, no voltage pulse appears across the terminals of winding 34d since rectifier 43 now provides a shunt path of negligible resistance across this winding. It is highly desirable to prevent a voltage pulse in winding 34d at this moment, because if a voltage pulse were permitted to appear, its polarity would be such as to reduce the restraining voltage output of rectifying system 24 thus tending to cause false relay operation.

The other half of the rectifying system 24 operates in a manner similar to that described above but in response to the opposite polarity half cycles of input voltage. The signal voltage across capacitor 38 will be reduced by a voltage pulse of peaking transformer winding 34c at a predetermined instant during each negative half cycle of input voltage. As the same instant, winding 34e will produce a voltage pulse to neutralize the immediate effect of peaking transformer operation in the associated output circuit. The successive negative half cycles of input voltage are represented by reference character 56 in Fig. 2, and the signal voltage across capacitor 38 has been indicated by the reference character 38V which represents the voltage of the capacitor terminal connected to rectifier 36 with respect to terminal $c$.

As can be seen in Fig. 2, the peaking transformer operates during a negative half cycle of input voltage in less than one-half cycle after a fault occurs at the arbitrarily chosen moment $t$ to produce a voltage pulse which causes a reduction in the magnitude of signal voltage at capacitor 38. If the fault condition occurring on the protected transmission line is near the impedance relay location, the transmission line voltage will suddenly decrease at moment $t$ to some magnitude less than the product of transmission line current multiplied by the preselected constant impedance. Thus, the voltage at input terminals $a$ and $b$ will become less than the voltage across the tapped portion of potentiometer 15, and the signal voltage of capacitor 38 is reduced to a magnitude whereby the restraining voltage, as adjusted by tap 33a of potentiometer 33, is smaller than the peak value of the operating voltage produced by rectifier 16. As a result, a net direct voltage of the proper polarity will appear at least intermittently across resistor 51, and direct current will flow from the positive terminal of rectifier 16, through resistor 51, through the output circuit including capacitor 38 and rectifier 40 of rectifying system 24, to the negative terminal of rectifier 16. The voltage across resistor 51 energizes grid 52a, and tube 52 is rendered fully conductive to produce a resultant unidirectional voltage signal across resistor 53. In this manner, a thyratron or the like is triggered, and impedance relay operation is obtained.

With the pulsing means operating at the peaks of input voltage, as shown, the relay will respond to the relative magnitudes of transmission line current and voltage regardless of the phase relationship between these two quantities. This is because the restraining voltage, as is demonstrated by Fig. 2, remains constant for the entire period between input voltage peaks. However, as explained hereinbefore, the input circuit of transformer 23 can be modified so that input voltage peaks occur before or after pulsing means operation, and when modified in this manner, the restraining voltage magnitude will be less than the peak magnitude of input voltage for predetermined portions of each cycle of transmission line voltage. This feature of my invention can be utilized to obtain an impedance relay operating characteristic which varies in controlled relation to the phase angle between transmission line current and voltage. For example, the circuit components could be arranged whereby the phase relationship between transmission line current and voltage are accurately reflected with a 60 degrees lagging displacement by the operating and input voltages (i.e., when line current is in phase with line voltage, operating voltage half cycles will lag input voltage half cycles by 60 degrees), and whereby the input voltage peaks will occur 60 degrees after operation by the pulsing means. As long as the transmission line current and voltage are in phase with respect to each other, the peak value of input voltage must be reduced to less than the peak value of operating voltage in order to operate the relay. But whenever current lags voltage by 60 degrees, relay operation will occur, due to the 60 degrees period of reduced restraining voltage, as soon as the peak value of input voltage becomes less than about twice the peak value of operating voltage.

Due to the isolating rectifiers 39 and 40, the impedance relay will respond as outlined above whenever either one of the two signal voltages across capacitors 37 and 38 becomes less than the operating voltage. In other words, the effective restraining voltage produced by rectifying system 24 comprises the lesser of the two signal voltages. Both signal voltages must be greater than the operating voltage to prevent or block operation of the relay. As is evident in Fig. 2, whenever the magnitude of input voltage is reduced, one or the other signal voltage will always respond within less than one-half cycle of input voltage frequency to reflect the decreased input.

While operating, the current drawn by resistor 51 tends to cause capacitors 37 and 38 to charge thereby raising the signal voltages above their proper level. However, the resistance of resistor 51 is relatively large, and the time constant of this charging circuit is relatively long with respect to the period of a cycle. Every half cycle peaking transformer 34 operates to produce alternately in its windings 34b and 34c voltage pulses which momentarily reduce the voltage levels of capacitors 37 and 38 respectively, and after such a voltage pulse each capacitor is recharged to a proper signal voltage level. Therefore, the effect of the current drawn by resistor 51 on the restraining voltage magnitude is negligible.

While I have shown and described a preferred form of my invention by way of illustration, many modifications will occur to those skilled in the art. I therefore contemplate by the concluding claims to cover all such modifications as fall within the true spirit and scope of my invention.

What I claim as new and desire to secure by Letters Patents of the United States is:

1. A rectifying system comprising, supply terminals adapted to be connected to a source of alternating current electric energy, first and second electric energy storing circuits, said first circuit being connected to said supply terminals by means of a first electric valve, said second circuit being connected to said supply terminals by means of a second electric valve in series relationship with said first valve, and impulsively operable means serially connected between said second electric valve and said second circuit for periodically redistributing the energy stored in the respective first and second circuits.

2. A rectifying system comprising, supply terminals adapted to be connected to a source of alternating current electric energy, a first electric energy storing circuit, means including a first electric valve connecting said first circuit to said terminals, a second electric energy storing circuit having greater energy storing capacity than said first circuit, means including a second electric valve in series with said first valve connecting said second circuit to said terminals, and pulsing means connected in said second circuit periodically to impel the transfer of energy from said first circuit to said second circuit.

3. In a rectifying system, alternating current input terminals, rectifying means connected to said terminals, a pair of impedance elements, a unilaterally conductive circuit including one of said elements, said circuit being connected to said rectifying means in parallel circuit relationship with the other element, pulsing means connected between said elements and operable at a predetermined moment during each cycle of alternating current to impel current circulation in said unilaterally conductive circuit and through said other element, and a pair of output terminals coupled to said other impedance element.

4. A rectifying system comprising, input terminals adapted to be connected to a source of alternating current electric energy, a first electric energy storing circuit, means including a first electric valve connecting said first circuit to said terminals, a second electric energy storing circuit having greater energy storing capacity than said first circuit, means including a second electric valve in series with said first valve connecting said second circuit to said input terminals, pulsing means connected in series with said second circuit and operable periodically to impel the transfer of energy from said first circuit to said second circuit, a pair of output terminals, and means connecting said first circuit to said output terminals including neutralizing means effective momentarily to offset the energy transferred from said first circuit to said second circuit.

5. In an electric current rectifying system, alternating voltage supply terminals, rectifying means connected to said terminals, energy storing means coupled to said rectifying means for obtaining a signal voltage equal to a predetermined portion of the peak magnitude of alternating voltage under steady state conditions, and pulsing means connected in circuit with said energy storing means and operable periodically to supply a voltage impulse of such magnitude and polarity as to cause said signal voltage to be momentarily reduced.

6. In an electric current rectifying system, alternating voltage input terminals, at least one half-wave rectifying element connected to said terminals, energy storing means coupled to said element for obtaining a relatively smooth output voltage having a predetermined relationship to the peak magnitude of alternating voltage under steady state conditions, and pulsing means connected to said energy storing means and operable at a preselected moment during each half cycle of alternating voltage for reducing said output voltage to a level approximately equal to the instantaneous magnitude of alternating voltage at said preselected moment.

7. In an electric current rectifying system, alternating voltage input terminals, rectifying means connected to said input terminals, an impedance circuit coupled to said rectifying means for developing a relatively constant direct reference voltage, energy storing means connected across said rectifying means to provide a direct signal voltage, unilaterally conductive pulsing means connected in circuit with said impedance circuit and with said energy storing means and impulsively operable for periodically removing energy from said energy storing means thereby depressing said signal voltage, direct voltage output terminals, and neutralizing means connected between said energy storing means and said output terminals, said neutralizing means being effective upon operation of said pulsing means momentarily to maintain across said output terminals voltage greater than said depressed signal voltage.

8. An electric current rectifying system comprising, alternating voltage supply terminals, an electric valve connected to said terminals to pass electric energy only during unipolarity half cycles of the alternating voltage, a first energy storing circuit coupled to said electric valve to store electric energy supplied by the source of alternating voltage during said half cycles and to retain the stored energy during the periods between said half cycles, a second energy storing circuit having less energy storing capacity than said first circuit connected to said electric valve, pulsing means operable periodically to redistribute the electric energy stored in said energy storing circuit, and blocking means connected to prevent said first energy storing circuit from supplying electric energy to said second energy storing circuit.

9. An electric current rectifying system comprising, input terminals adapted to be connected to a source of alternating voltage whose magnitude is subject to variations, rectifying means connected to said input terminals to permit current flow only during unipolarity half cycles of the alternating voltage, a first energy storing circuit coupled to said rectifying means to produce a reference voltage in response to said current flow and to maintain said reference voltage relatively constant during the periods between the voltage peaks of said half cycles, a second energy storing circuit having less energy storing capacity than said first circuit connected to said rectifying means and responsive to electric energy supplied by the source of alternating voltage to provide a signal voltage, means interconnecting said first and second circuits in parallel circuit relationship including first pulsing means operable periodically to produce a pulse of voltage opposing said reference voltage thereby immediately reducing the energy stored by said second circuit, said interconnecting means including blocking means to prevent the transfer of energy from said first circuit to said second circuit whenever said signal voltage is less than said reference voltage, output terminals adapted to be connected to load circuit, means coupling said second circuit to said output terminals including second pulsing means operable simultaneously with said first pulsing means to produce within said coupling means a pulse of voltage opposing the voltage pulse produced by said first pulsing means.

10. An electric current rectifying system comprising, input terminals adapted to be connected to a source of variable alternating voltage, half-wave rectifying means connected to said input terminals to permit current flow only during unipolarity half cycles of the alternating voltage, a capacitor connected to said rectifying means for charging by said current flow to provide a direct signal voltage, an impedance circuit having more energy storing capacity than said capacitor coupled to said rectifying means to produce a reference voltage in response to said current flow and to maintain said reference voltage relatively constant during the periods between the peaks of said half cycles of voltage, means interconnecting said capacitor and said impedance circuit including means impulsively operable during said half cycles to discharge said capacitor and immediately to reduce the magnitude of said signal voltage, said interconnecting means including blocking means to prevent utilization of the energy stored in said impedance circuit for recharging said capacitor, whereby said capacitor can be recharged immediately following each operation of said pulsing means only in response to said current flow, output terminals adapted to be connected to a load circuit, and means coupling said capacitor to said output terminals including neutralizing means operable when said pulsing means operates momentarily to prevent the resulting reduction in signal voltage magnitude from appearing across the output terminals.

11. In an electric current rectifying system, output terminals adapted to be connected to a load circuit, input terminals adapted to be connected to a source of variable alternating voltage, a plurality of electric valves connected to said input terminals to form full-wave rectifying means, an impedance circuit coupled to said rectifying means to provide a reference voltage and to maintain said reference voltage substantially constant during the periods between the peaks of successive half cycles of the alternating voltage, first and second capacitors connected to said rectifying means and each having less energy storing capacity than said impedance circuit, said first capacitor being disposed to be responsive to positive half cycles of the alternating voltage for providing a first direct signal voltage, said second capacitor being disposed to be responsive to negative half cycles of the alternating voltage for producing a second direct signal voltage, means interconnecting said first capacitor and said impedance circuit including first pulsing means and first blocking means, said first pulsing means being disposed to produce during each of said positive half cycles a voltage impulse opposing said reference voltage thereby instantly reducing the magnitude of said first signal voltage, said first blocking means being disposed to prevent the transfer of electric energy from said imput circuit to said first capacitor, whereby said first signal voltage can be increased from its reduced magnitude immediately following a voltage impulse only in response to the alternating voltage, means interconnecting said second capacitor and said impedance circuit including second pulsing means and second blocking means, said second pulsing means being disposed to produce during each of said negative half cycles a voltage impulse opposing said reference voltage thereby instantly reducing the magnitude of said second signal voltage, said second blocking means being disposed to prevent the transfer of electric energy from said impedance circuit to said second capacitor, whereby said second signal voltage can be increased from its reduced magnitude immediately following a voltage impulse only in response to the alternating voltage, a first output circuit connected to said output terminals comprising first neutralizing means, first isolating means and said first capacitor, said first neutralizing means being disposed for coordination with said first pulsing means momentarily to prevent each voltage impulse produced by said first pulsing means from affecting said first output circuit, and a second output circuit connected to said output terminals comprising second neutralizing means, second isolating means and said second capacitor, said second neutralizing means being disposed for coordination with said second pulsing means momentarily to prevent each voltage impulse produced by said second pulsing means from affecting said second output circuit, said first isolating means being disposed to prevent the transfer of electric energy from said first capacitor to said second output circuit, said second isolating means being disposed to prevent the transfer of electric energy from said second capacitor to said first output circuit.

12. In a protective relaying system of the impedance type for an alternating current electric power transmission line; translating means responsive to line current for producing an operating voltage which comprises unipolarity half cycles of voltage related to the line current by a predetermined impedance; a rectifying system responsive to line voltage for producing a restraining voltage which comprises relatively smooth direct voltage representative of the line voltage, said rectifying system comprising rectifying means coupled to the transmission line, a first energy storing element connected to said rectifying means, a second energy storing element having greater energy storing capacity than said first element, a unilaterally conductive circuit connecting said second element to said rectifying means, said circuit including pulsing means operable at least once during each cycle of live voltage to impel the transfer of energy from said first element to said second element, and an output circuit including said first element and means effective momentarily to offset the energy transferred from said first element to said second element due to pulsing means operation, said restraining voltage being provided by said output circuit; and means supplied by said operating and restraining voltages for producing a resultant signal when the restraining voltage is less than the operating voltage.

13. A protective relaying system of the impedance type for an alternating current electric power transmission line comprising, means responsive to the line current for developing an alternating voltage related to line current by a predetermined impedance, means responsive to said developed alternating voltage for producing direct operating voltage proportional to the instantaneous magnitude of developed voltage, means responsive to line voltage for deriving an alternating input voltage representative of the line voltage, rectifying means supplied by said input voltage, energy storing means coupled to said rectifying means for obtaining relatively smooth direct restraining voltage having a predetermined relationship to the peak magnitude of said input voltage under steady state conditions, pulsing means connected in circuit with said energy storing means and operable periodically to reduce said restraining voltage to not less than the instantaneous magnitude of input voltage at the moment of pulsing means operation, and means supplied by said operating and restraining voltages for producing a resultant voltage signal when the restraining voltage magnitude is less than the operating voltage magnitude.

14. A protective relaying system of the impedance type for an alternating current electric power transmission line comprising, means responsive to the line current for developing an alternating voltage related to line current by a predetermined impedance, means responsive to said developed alternating voltage for producing direct operating voltage proportional to the instantaneous magnitude of developed voltage, means responsive to line voltage for deriving alternating input voltage having fixed phase and magnitude relationships to the line voltage, rectifying means supplied by said input voltage, energy storing means coupled to said rectifying means for obtaining relatively smooth direct restraining voltage having a maximum magnitude substantially equal to the amplitude of said input voltage under steady state conditions, pulsing means connected in circuit with said energy storing means and operable at a preselected moment during each cycle of input voltage for reducing said restraining voltage from said maximum magnitude to not less than the instantaneous magnitude of input voltage at said preselected moment, whereby the magnitude of said restraining voltage may be maintained at less than its maximum during the period between said preselected moment and the succeeding input voltage peak, and means supplied by said operating and restraining voltages for producing a resultant voltage signal whenever the operating voltage exceeds the restraining voltage by greater than a predetermined amount.

15. In a protective relaying system of the impedance type for an alternating current electric power transmission line: translating means responsive to line current for producing an operating voltage which comprises unipolarity half cycles of voltage related to the line current by a predetermined impedance; a rectifying system responsive to line voltage for producing a restraining voltage which comprises relatively smooth direct voltage representative of the line voltage, said rectifying system comprising rectifying means coupled to the transmission line, a pair of impedance elements, a unilaterally conductive circuit including one of said elements, means connecting said circuit in parallel with the other element to said rectifying means, said circuit including means impulsively operable to impel current flow therein, and an output circuit including said other element and neutralizing means operable to offset momentarily the effect of the impelled current flow, said restraining voltage being provided by said output circuit; and means supplied by said operating and restraining voltages for producing a resultant signal when the restraining voltage is less than the operating voltage.

References Cited in the file of this patent
UNITED STATES PATENTS

| | | |
|---|---|---|
| 2,078,792 | Fitzgerald | Apr. 27, 1937 |
| 2,287,504 | Warrington | June 23, 1942 |
| 2,381,375 | Warrington | Aug. 7, 1945 |
| 2,381,527 | Traver | Aug. 7, 1945 |
| 2,663,839 | Marshall | Dec. 22, 1953 |
| 2,829,251 | Patton | Apr. 1, 1958 |
| 2,845,581 | Hodges | July 29, 1958 |
| 2,879,454 | Hodges | Mar. 24, 1959 |